Feb. 14, 1961 P. C. JURS ET AL 2,971,531
RELIEF VALVE
Filed Feb. 27, 1956 3 Sheets-Sheet 1

INVENTORS
JOSEPH P. VAN OVERVEEN
PETER C. JURS
BY
ATTORNEYS.

Feb. 14, 1961 P. C. JURS ET AL 2,971,531
RELIEF VALVE
Filed Feb. 27, 1956 3 Sheets-Sheet 2
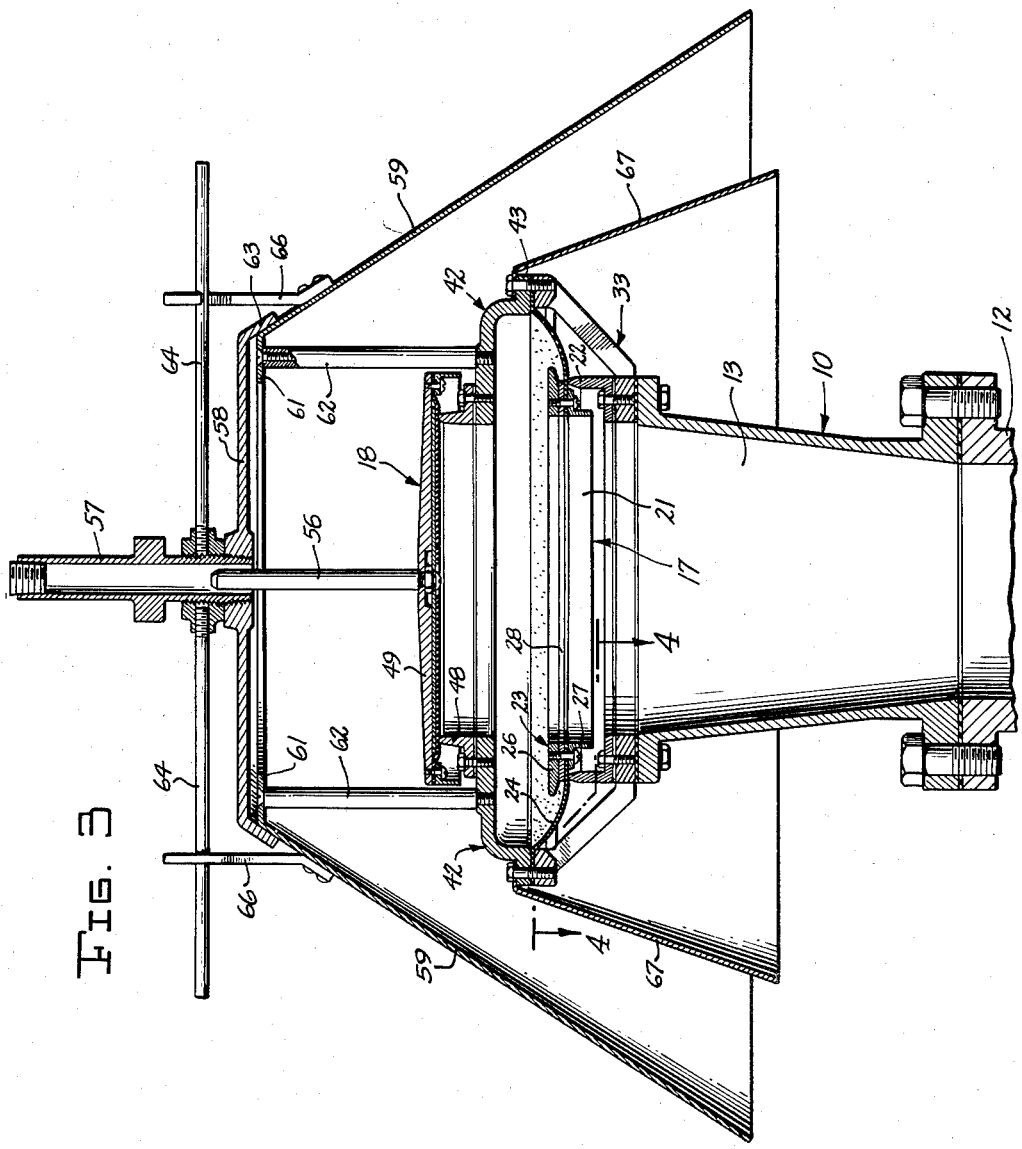
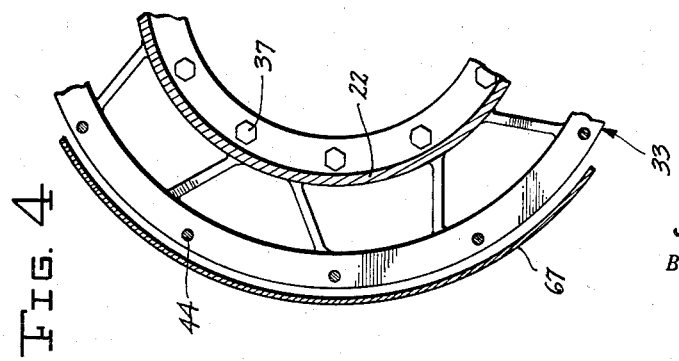
INVENTORS
JOSEPH P. VAN OVERVEEN.
PETER C. JURS
BY
ATTORNEYS.

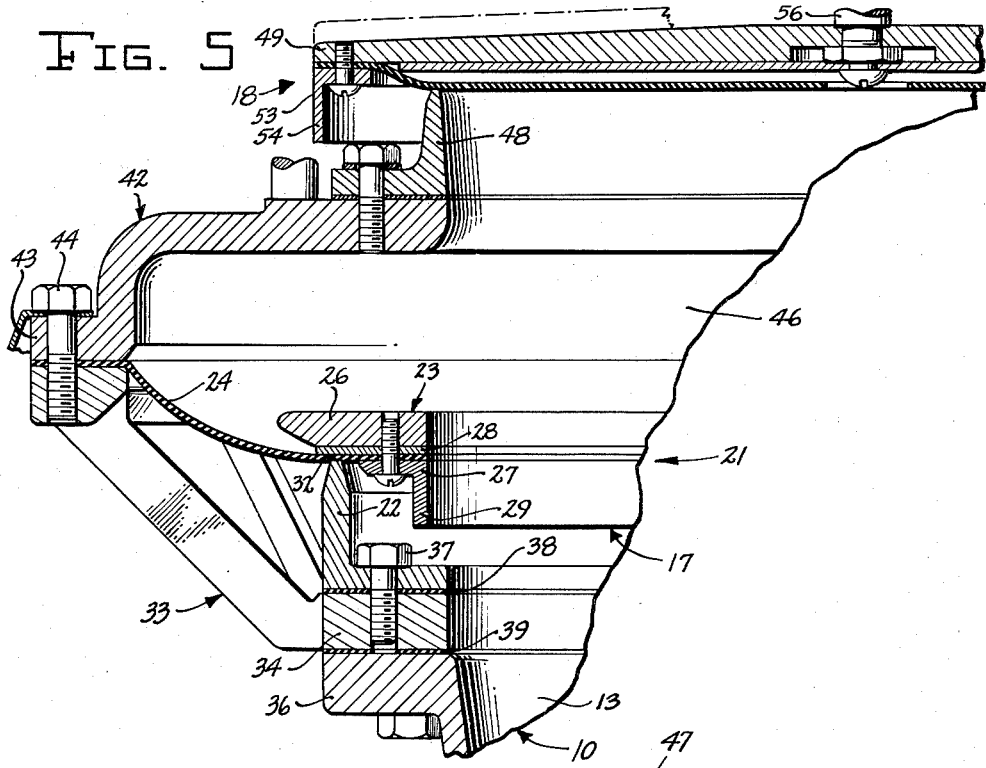
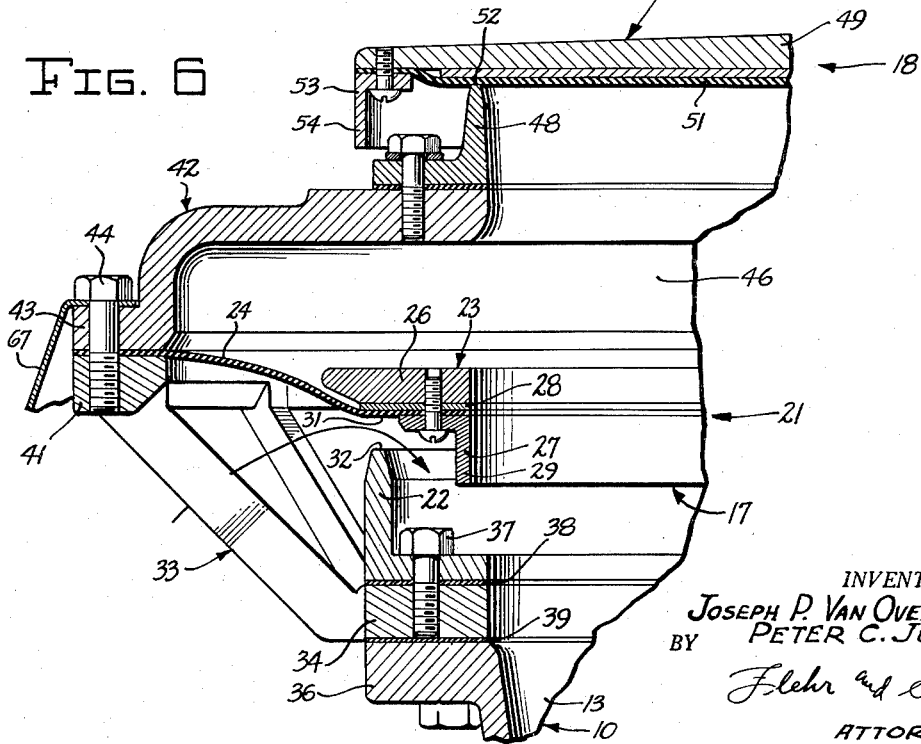

United States Patent Office 2,971,531
Patented Feb. 14, 1961

2,971,531

RELIEF VALVE

Peter C. Jurs, Oakland, and Joesph P. Van Overveen, Lafayette, Calif., assignors to Shand and Jurs Company, Berkeley, Calif., a corporation of California Filed Feb. 27, 1956, Ser. No. 568,016

2 Claims. (Cl. 137—493.9)

This invention relates generally to relief valves such as are employed for protecting liquid tanks or other fluid systems from excessive gas or vapor pressure or vacuum conditions.

Venting or relief valves such as have been used to protect storage tanks from excessive pressure or vacuum conditions, have commonly employed separate valve devices disposed side by side and carried by a common body. An example of this type of relief valve is disclosed and claimed in copending application Serial No. 238,839, filed July 27, 1951, now issued into Patent No. 2,732,857, on January 31, 1956. While such constructions give satisfactory results in many commercial applications, they are subject to certain inherent limitations. Particularly for a given diameter of seat passage and tank pressure, the flow capacity is limited due to the nature of the flow paths through the seat passage and the connecting passages of the body. Good flow capacity is important particularly for relieving excess pressures. In addition such prior constructions have limitations with respect to cost of manufacture, due to the character of the body and the mountings for the seat rings and valve members.

In general it is an object of the present invention to provide an improved relief valve of the above character having better flow capacity characteristics.

Another object of the invention is to provide a device of the above character which is relatively compact and simple to manufacture, compared to prior devices.

Another object of the invention is to provide a relief valve of the above character having a continuously expanding flow passage under pressure flow conditions.

Further objects and features of the invention will appear from the following description in which the preferred embodiment has been set forth in detail in conjunction with the accompanying drawings.

Referring to the drawings:

Figure 3 is a cross sectional view on an enlarged scale taken along the line 3—3 of Figure 2.

Figure 4 is a cross sectional detail taken along the line 4—4 of Figure 3 showing a portion of the vacuum inlet ring.

Figure 5 is an enlarged cross sectional view of a portion of our device showing the pressure pallet being moved to a venting position.

Figure 6 is an in enlarged cross sectional view of a portion of our device showing the vacuum pallet in a venting position.

Figure 1:
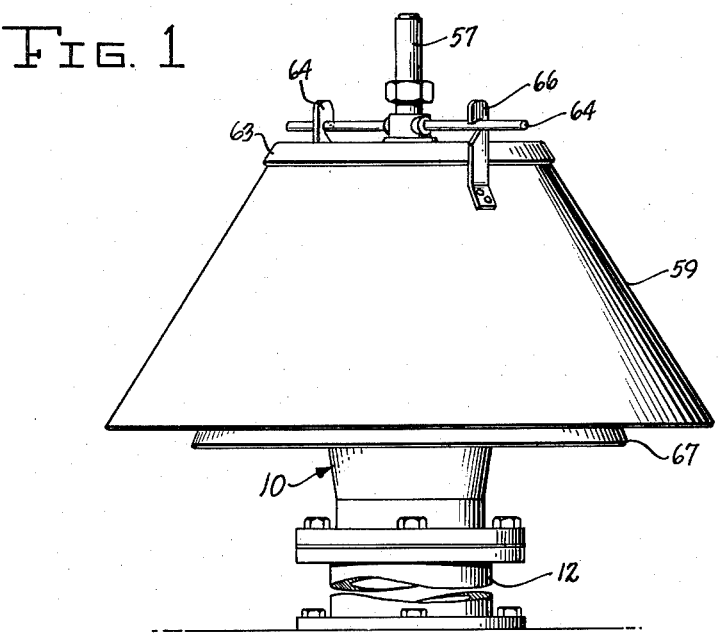
Figure 1 is a side elevational view showing a combined pressure and vacuum release valve incorporating the features of my present invention.
Figure 2:
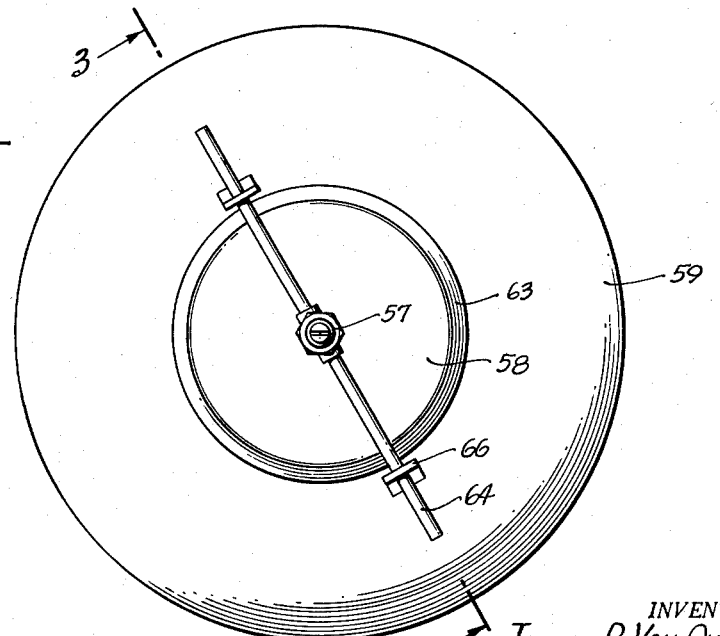
Figure 2 is a plan view of the device shown in Figure 1.

The relief valve illustrated in the drawing consists of a body 10 having its lower end adapted to be connected to a pipe 12 or other part of a pressure system to be protected. In a typical installation the pipe 12 is directly mounted upon the top wall of a tank. The tank may for example contain gasoline or other volatile liquid.

The flow passage 13 through the body 10 preferably is continuously expanding towards its upper end, as illustrated. The body serves to mount vacuum relief valve means designated generally at 17, and pressure relief means designated generally at 18.

The vacuum relief valve means 17 consists of an annular assembly 21, which can be referred to as an annular pallet assembly and which is associated with a stationary seat ring 22. The pallet assembly includes the rigid ring assembly 23, and the flexible diaphragm member 24. The diaphragm can be formed of suitable material such as fabric reinforced synthetic rubber.

The assembly 23 preferably consists of an upper rigid pallet ring 26 together with a lower clamping ring 27. The inner margin of the diaphragm member 24 is interposed between these rings, and in addition a gasket or annual member 28 of suitable cushioning material, such as cork impregnated with neoprene or like synthetic rubber, is interposed between the diaphragm and the lower face of the pallet ring 26. Clamping ring 27 can be L-shaped in section to provide the depending rim 29. The annular region 31 of the diaphragm member 24 is adapted to contact and seat upon the upper valve working surface 32 of the seat ring 22.

An annular spider 33 has an inner annular portion 34 mounted upon the top flange 36 of the body 10. It is convenient to mount the seat ring directly upon the annular portion 34, by means of screws 37. Suitable sealing gaskets 38 and 39 can be provided.

The annular portion 41 of the spider 33 forms a mounting for the annular member 42. The outer margin of the diaphragm member 24 is interposed between the outer flange 43 of member 42, and the annular member 41. These parts are clamped together by suitable means such as screws 44.

The annular member 42 is formed concave to provide a space 46 overlying the pallet assembly 21.

The pressure relief means consists of a pallet assembly 47 together with a seat ring 48. The seat ring is shown mounted upon the inner margin of the annular member 42. The assembly 47 consists of the rigid pallet member 49, together with a flexible diaphragm member 51. This diaphragm member can likewise be made of a suitable material, such as fabric reinforced resilient synthetic rubber. The outer margin of the diaphragm member 51 extends a substantial distance beyond the valve working surface 52 of the seat ring 48, and is clamped in seat relation to the peripheral margin of the rigid pallet member 49, by the clamping ring 53. This ring can likewise be formed L-shaped in section to provide the depending rim 54.

The pallet assembly 47 preferably is provided with suitable guide means to retain it in alignment with the seat ring 48. Guide stem 56 has its lower end attached to the pallet member 49, and the upper portion of this stem extends loosely within the guide pipe 57. The guide 57 is in turn carried by the cover plate 58. This construction is substantially disclosed in copending application Serial No. 238,839 filed July 27, 1951.

It is desirable to provide a deflecting hood 59 which deflects discharging gas downwardly, when pressure is being relieved. As illustrated in Figure 3 this hood may be shaped in the form of a truncated cone. The flange 61 at its upper end is shown attached to the supporting standards 62, which in turn are carried by the rigid annular member 42. The cover plate 58 is shown provided with an outer rim 63 adapted to seat upon the upper end of the hood. The cover may be held in place by suitable means such as the hold down rods 64, which are adapted to latch under the hooks 66 carried by the hood.

In some instances it may be desirable to use a second hood 67. This hood has its upper end attached to the flange 43 on the rigid member 42 and extends downwardly to generally embrace the spider 33, in a manner illustrated in Figure 3. Hood 67 directs flow under conditions of relieving excess vacuum.

Operation of my relief valve is as follows: The weight of the vacuum pallet assembly serves to yieldably urge or load the same whereby under normal conditions the annular region 31 of the diaphragm member 24 is in sealing contact with the valve working surface 32 of seat ring 22. Such closed condition of the vacuum pallet assembly is shown in Figure 5. The pressure pallet assembly 47 is likewise weight loaded to closed position, whereby an annular portion of the diaphragm member 51 is in sealed contact with the valve working surface 52. When no pressure differential exists between the passage 13 and the atmosphere, the pressure pallet assembly assumes the position shown in Figure 6. However with a rise in tank pressure the pallet assembly tends to rise in a manner illustrated in Figure 5, to provide a form of floating action as described in the above mentioned copending application. When the pressure passage 13 reaches the value for which the device is set to open, sealing contact is broken between the diaphragm member 51 and the seat ring 48, and the pallet assembly 47 moves upwardly to full open position. Movement to full open position is aided by the deflecting action of the depending rim 54. When the pressure pallet assembly is in open position, gas flows directly through the continuously expanding passage 13, through the aligned openings of the vacuum pallet assembly 21 and the seat ring 48, and then outwardly and downwardly through the hood 59. The cross sectional flow areas at various points in the path of flow of the gases are such that the gases are continuously expanding through flow areas of increasing cross sectional area, thus making possible high flow capacity for a given pressure differential and valve size.

Under pressure conditions the pallet assembly 21 maintains good sealing contact with the valve working surface 32 of the seat 22. Pressure is maintained between the annular region 31 of the diaphragm member 24, and the valve working surface 32, which incerases with increasing pressure. Assuming that vacuum conditions occur within the tank and the flow passage 13, atmospheric pressure presses upwardly upon the diaphragm member 24 tending to raise the ring assembly 23. As the atmospheric pressure presses upwardly on the diaphragm member, the diaphragm member is rolled away from the seat 22 which facilitates breaking of any ice formation which may have formed between diaphragm and the seat. When the vacuum reaches a value at which the device is set to open, ring assembly 23 is lifted upwardly to open position, with the pallet ring 26 engaging the bottom piece of a member 42. Relatively full opening action is obtained by using the deflecting rim 37. As shown in Figure 6 this permits atmospheric air to pass downwardly through the passage 13 into the tank.

It will be evident from the foregoing that we have provided a relief valve which provides good protection for tanks or other pressure systems, and which is characterized by relatively high flow capacity, particularly when relieving excess pressures. The construction is relatively compact and simple to manufacture, due to the manner in which the vacuum and pressure pallet assemblies are constructed and mounted with respect to each other.

We claim:

1. In a relief valve, a body having a flow passage adapted to be connected to a source of fluid pressure or vacuum, an annular seat, a rigid annular member carried by the body, a rigid annular member having an opening therethrough communicating with the passage of the body, pressure valve means carried by the rigid annular member to permit flow of fluid from said passage under conditions of excess pressure, a hood mounted on said rigid annular member and being formed to provide a continuously expanding flow passage between the hood and the body, an annular seat carried by the body and forming a horizontal valve working surface, an annular pallet assembly overlying the seat and including a flexible diaphragm member extending outwardly from the seat and having its outer margin secured to and sealed with respect the said annular member, said vacuum pallet assembly also including a ring assembly secured and sealed with respect to the inner margin of the diaphragm, a portion of said ring assembly overlying the seat and the inner margin of the diaphragm member and serving to press the diaphragm member into sealing engagement with the valve working surface of the annular seat for closed position of the vacuum pallet assembly, a major portion of the ring assembly being disposed within the annular seat, said ring assembly having a continuously open flow opening therethrough in alignment with the passage in said body, and an additional hood secured to the rigid annular member and arranged within the first named hood to provide a flow passage leading to said vacuum pallet assembly.

2. In a vacuum relief valve, a body with a continuously expanding flow passage adapted to be connected to a source of vacuum, a rigid annular member carried by the body, the rigid annular member having an opening therethrough communicating with the passage in said body, an annular seat carried by the body and forming a horizontal valve working surface, and an annular vacuum pallet assembly overlying the seat and including a flexible diaphragm member extending outwardly from the seat and having its outer margin secured to and sealed with respect to the rigid annular member, said vacuum pallet assembly also including a ring assembly secured to and sealed with respect to the inner marginal portion of the diaphragm member, said ring assembly comprising an upper rigid pallet ring, a lower clamping ring, the inner marginal portion of said diaphragm member being interposed between said upper rigid ring and said lower clamping ring, and a plurality of spaced fastening means disposed around the outer marginal portion of the lower clamping ring and securing the upper rigid ring, the inner marginal portion of the diaphragm member and the lower clamping ring into a unitary ring assembly, said clamping ring being disposed within the confines of said annular seat, an annular portion of said rigid pallet ring overlying the seat and the inner marginal portion of the diaphragm member and serving to press the diaphragm member into sealing engagement with the valve working surface of the annular seat for closed position of the vacuum pallet assembly, said rigid pallet ring, said diaphragm member and said lower clamping ring having continuously open flow openings therein in general alignment with the passage in said body and forming a fluid conduit directly exposed to the fluid, said flow openings in said upper rigid pallet ring and said lower clamping ring having a diameter substantially as great as the diameter of the annular seat, and means supported by said rigid annular member and serving to enclose the space overlying the vacuum pallet assembly, said vacuum pallet assembly being moved to open position under conditions of excess vacuum applied to said passage.

References Cited in the file of this patent

UNITED STATES PATENTS

| | | |
|---|---|---|
| 1,493,083 | Ripley | May 6, 1924 |
| 1,839,962 | Groeniger et al. | Jan. 5, 1932 |
| 1,897,076 | Shand | Feb. 14, 1933 |
| 2,317,923 | Lebo | Apr. 27, 1943 |
| 2,511,435 | Griswold | June 13, 1950 |
| 2,530,536 | Oldham | Nov. 21, 1950 |
| 2,557,536 | Drane | June 19, 1951 |
| 2,747,594 | Boetjer | May 29, 1956 |
| 2,879,786 | Heideman | Mar. 31, 1959 |